Patented Nov. 29, 1949

2,489,267

UNITED STATES PATENT OFFICE 2,489,267

EXPANDED PLANT PRODUCT AND METHOD OF MAKING SAME

Chester W. Chapin, Chicago, Ill.; Helen Wilken Chapin and Susan Chapin Mackebee, administratrices of said Chester W. Chapin, deceased, assignors (individually and as administratrices) to Allied Mills, Inc., Chicago, Ill., a corporation of Indiana No Drawing. Application April 3, 1944, Serial No. 529,403

3 Claims. (Cl. 99—82)

The present invention relates to a novel type of expanded or puffed plant product and to a method for making the same.

Puffed whole-grain cereals, of the type sometimes described as being "shot from guns," are old and well known. I am not aware, however, that anyone, prior to the present invention, has succeeded in producing coherent porous masses from granulated plant products, including meals formed by the grinding of cereals, legumes, and the like.

My invention comprehends the employment, as an expanding agent for the various granulated plant products that I may treat by my novel process, of a water-expandible clay, the particles of which will expand or swell in the presence of water or moist steam to form a gelatinous or gluey paste. A representative example of such a water-expandible clay is a bentonite of the so-called Wyoming or Black Hills type. Such a bentonite will swell in water to as much as thirty times its original volume to form a gelatinous paste. This same bentonite commonly is designated as sodium bentonite, because its content of sodium is responsible for the water absorption and swelling which is its most unique characteristic.

Hereinafter I shall use the terms "water-expandible clay" and "bentonite" more or less interchangeably. In using the term "water-expandible clay," however, I do not limit myself to a bentonite under that name. Rather, I shall use the term "water-expandible clay" to denote any clay that possesses bentonite-like characteristics, and which may be employed in the practice of my novel process to effect suitable expansion of a plant meal and to form thereby my novel expanded plant product.

A principal object of my invention is to provide a novel method of transforming a meal or granular powder of plant origin into an expanded light-weight, open-textured or porous solid.

A correlative principal object is to provide a novel composition in the form of a light-weight, coherent, porous solid derived from a meal or flour of plant origin.

Another object is to provide a method of forming, from a meal or flour of plant origin, an expanded, open-textured solid food product without the use of baking powder, yeast or equivalent material.

Another object is to provide an open-textured breadstuff which is more friable and more easily masticated and insalivated than unleavened breadstuffs of the prior art derived from like sources.

Another object is to provide a novel method of transforming granular plant materials, such as sawdust, ground plant stalks and hulls, cellulosic fibers, and the like, into light-weight, coherent, open-textured solids suitable for use as thermal insulating agents, fillers, packing materials, etc. Hereinafter I shall use the term "wood meal" to include sawdust, ground plant stalks, leaves and hulls, cellulosic fibers and the like.

Another object is to provide a novel thermal insulating material in the form of an expanded, light-weight, porous solid derived from granular woody material or from a similar coarsely ground material of plant origin.

Other objects and uses of my invention will appear as the description thereof progresses.

Examples of the substances of plant origin that are adapted for treatment by my novel process to form the lightweight porous products which embody my invention, and which are suitable as foods for man and/or lower animals, are: Meals, granulations and flours, the last preferably coarse and unbolted, derived from dried cereals and similar seed crops, including wheat, corn, oats, barley, rice, rye, buckwheat, and millet; and dried legumes, including peas, beans, lentils, and the like. I do not limit myself, however, to the edible crops that I have just named. Rather, I comprehend, as coming within the scope of my invention, any plant product that is accounted a food for man and/or lower animals, which product is obtainable in a form suitable for crushing, grinding, attrition or comminution to form a substantially free-flowing meal or granular powder, wherewith to practice my invention.

As I already have indicated, with reference to the aforementioned objects of my invention, I may employ inedible plant products of the widest variety in forming types of expanded, porous products which may be used in numerous situations as light-weight fillers and packing materials, as thermal insulating agents, and so forth. Hereinafter my use of the term "plant meal," without more, will comprehend any crushed, ground or comminuted plant material, or mixture of such materials, whether edible or not, the particle size whereof adapts the material for sufficiently ready softening in the presence of a water-expandible clay, as aforedescribed, and of water vapor and a cooking temperature at, or somewhat above, the boiling point of water, so that upon subjecting the hot material to a high pressure, and suddenly releasing the pressure, a coalesced, expanded, porous mass results.

In the practice of my novel process I first form, in a batch blender or other suitable mixer, a substantially homogeneous dry mixture of my selected plant meal with a predetermined proportion, relative thereto, of dry water-expandible clay. I preferably employ a finely granular type of bentonite which is marketed under the name "Volclay;" although I do not limit myself thereto.

The proportion of bentonite to plant meal is dependent upon various factors, including the make-up, chemical and physical, of the plant meal, whether, for example, the meal comprises a cornmeal or soybean meal or sawdust, or a mixture of two or more meals. Another factor which determines the proportion of bentonite to be used in a given operation is the degree of porosity, or the correlative density—desired in the final product. Where the latter is to be used as a food, I preferably keep within the range of 0.5 percent to 3 per cent of bentonite, calculated on the weight of the plant meal. I may, however, if desired, increase the ratio of water-expandible clay to plant meal up to about 10 per cent.

The next, or second, step in my novel process comprises incorporating into the plant meal-bentonite mixture, with suitable mixing, a small amount of water, varying preferably from about 3 per cent to about 8 per cent of the weight of the plant meal-bentonite mixture. Either just prior to, or during, or immediately after the addition of the water, I subject the mixture for a short period to a cooking temperature above the temperature of boiling water, i. e., above 212° F., but preferably not above 300° F. The cooking period may be as short as about one to three minutes, or it may be extended farther, say, to 15 minutes or more, depending principally upon the type of apparatus used in this and the subsequent stages of my process, as well as upon the readiness with which the individual grains of the particular plant meal become sufficiently softened, under the moisture and heat, and coated with the glutinous, moist bentonite. At the end of a suitable cooking period the system preferably assumes the form of a plastic mass of a consistency approximating that of bread dough.

The hot plastic mass of plant meal and water-expandible clay next is subjected to a compression pressure at least sufficient to liquefy any steam that has formed in the mass at the cooking temperature employed. Preferably, however, the pressure should be sufficient to overcome the swelling pressure of colloidal constituents of the plant meal, particularly the starches and related polysaccharides; such a pressure being at least several hundred pounds per square inch. The minimal compression pressure, at any rate, should be such that, upon sudden release thereof, the compressed plastic mass will expand with sufficient suddenness so that the desired porosity is developed in the final product. A wide range of pressures, however, may be employed, conditioned principally upon the degree of porosity of the product that may be desired, and upon the volume of the mass being compressed. Thus the pressures may range from a few hundred pounds per square inch up to 20,000 pounds per square inch. Hereinafter I shall use the term "high pressure" to denote a compression pressure sufficient in a given case to accomplish the essential results that I have just set forth.

Within a few seconds after the desired pressure has been attained, the pressure is suddenly released, whereupon the plastic mass expands almost explosively to occupy an increased volume ranging up to about 15 times that of the original mixture, depending upon one or more of the several factors already pointed out. The sudden expansion of the mass facilitates its subsequent cooling, so that it very quickly forms a crisp, friable solid, highly porous in character and correspondingly light in weight.

The apparatus employed in the final steps of my novel process may be any one of several, and varied, types. For example, I may use an extrusion machine which provides for the building up of a sufficiently high pressure upon the plastic mixture of plant meal and bentonite, as well as means for intermittent, or even continuous, extrusion of the compressed mixture onto a conveyor or into a suitable receptacle.

Again, I may transfer a quantity of a hot, plastic mass of the plant meal and bentonite to a flat mold in a suitably heated press, subject the mold to a predetermined pressure, and then quickly release the pressure. Or I may transfer an unheated mixture of plant meal, water-expandible clay and water to a mold in a heated press, and proceed as last described.

Where I am not concerned, however, that my expanded plant product shall assume a specific shape, I prefer to carry out the major steps of my process in an Anderson oil expeller. Although this machine is designed primarily for expressing oil from various plant materials, I have found that it is entirely suitable for the practice of my novel process, where, as I have said, diversity of shape of my expanded plant meal products is of no consequence.

The pertinent structural features of the Anderson oil expeller are sufficiently touched upon in the following illustrative example of the practice of my invention on a commercial scale.

Seven hundred fifty pounds of whole corn were passed through an attrition mill to form a typical meal of the usual particulate size. With this quantity of meal there were mixed, thoroughly and uniformly, 7.5 pounds of sodium bentonite ("Volclay" brand). The ratio of bentonite to cornmeal thus was one per cent. The mixture was heated in a steam cooker, with no added moisture, for 15 minutes at a temperature of about 230° F. It next was conveyed to the hopper of an Anderson oil expeller.

As the mixture was mechanically propelled through the heated lower conditioner of the expeller, water was admitted into the conditioner at a rate sufficient to increase the moisture content of the mixture by about 3 per cent. The resulting plastic mixture then was passed into the pressure barrel of the expeller, the barrel bars of which had been closed, so that virtually the only outlet was through the cone at the end of the barrel. Under the compressive force of the slowly revolving screw conveyor the mixture at the forward end of the expeller barrel was forced through the cone under a pressure of the order of 15,000 pounds per square inch. It appeared outside the cone in a succession of twisting segments which expanded instantly with a loud cracking noise. The segments breaking away from the cone cooled and hardened very rapidly, forming light-colored and very light-weight, crisp, highly porous masses. The density of this loose-textured corn product approximated that of balsa wood. It was friable, and could be masticated and insalivated substantially as readily as a moderately hard, dry graham cracker.

I have found that the combined heating and steaming of the plant meal-bentonite mixture in the lower conditioner of the oil expeller ordinarily is adequate to effect the softening and formation of a hot, plastic mass suitable for the final step of the operation in the pressure barrel of the expeller. In my preferred practice, therefore, where I employ the Anderson oil expeller, I now omit the step of precooking the dry plant meal-bentonite mixture in a separate cooker; but, instead, convey the dry mixture of plant meal and bentonite directly from the blender to the hopper of the oil expeller, and proceed therefrom in the manner that I have just described with reference to the foregoing illustrative example of the commercial practice of my invention.

When, on the other hand, my novel expanded plant-meal product is formed in a press of the sort used for compression molding of plastic resins, it may be desirable to form the hot plastic mass of plant meal, and bentonite, which is to be compressed and expanded in such a form of press, by precooking the mixture of plant meal and bentonite in the presence of the suitable small addition of water such as I introduce into the lower conditioner of the oil expeller.

In addition to the basic ingredients that I employ to form my novel expanded plant products, namely, a plant meal and a water-expandible clay, I may incorporate therewith any one or more of a wide variety of accessory food substances, including, for example, coloring matters, chocolate, sweetening agents, vitamins, in crude or refined form, minerals, essential oils, condiments, spices, meat extracts, et cetera. I have found, for example, that, by incorporating a meat extract (specially prepared for dog foods) into a cornmeal-bentonite mixture, such as that which I have described in the above example of my commercial practice, I have been able, through the practice of my process, to form a type of loose-textured biscuit which is greatly relished by dogs.

Any accessory food substances of the type that I have named above may be incorporated with the plant meal at any suitable stage in my process, either at the time that the water-expandible clay is mixed therewith, or in, or along with, the water that is added to the plant meal-clay mixture. Or the food accessory material may be incorporated in a suitable manner with the hot plastic mass, previously described, just before the latter is subjected to a high pressure. Hereinafter I shall use the term "accessory food material" to denote a member or combination of members of the class just described.

I offer the following as a present tentative explanation of the mechanism involved in the transformation of a plant meal into an expanded product embodying my invention. Prefatory thereto, I may say that I had been told by experts in the field of puffed grains, now common as breakfast foods, that a prerequisite to the successful formation of such puffed products was the treatment of entire, i. e., unbroken grains. In my experience, too, plant meals devoid of bentonite, when subjected to the steps of my process wherein an oil expeller is used, have been ejected from the pressure barrel in the form of hard, unexpanded, nonporous masses. I assume, therefore, that the bentonite, in the presence of the added water, absorbs some of the same and forms a thin, but tenacious coating over the individual particles of the plant meal. This coating may be sufficiently elastic, however, so that when the greatly compressed superheated water within an individual, bentonite-coated particle, expands upon sudden release of the pressure, it cannot escape as readily as from a particle devoid of the bentonite coating; and so each plant-meal particle tends to form a minute hollow spheroid, the very thin walls of which comprise the softened substance of the plant-meal particle mixed with the small fraction of glutinous bentonite. In the few seconds before these spheroids cool and harden, the walls thereof retain enough adhesiveness to bond them to their immediate neighbors. In such a fashion, I assume, are formed the masses of substantial size which constitute typical embodiments of my invention.

I claim:

1. The method of expanding corn meal to form a dry, friable, lightweight, porous solid, expanded up to about fifteen times the unexpanded volume of the corn meal, which comprises, intimately incorporating with a quantity of corn meal a small proportion, below 5.0 per cent but not substantially less than 0.5 per cent, calculated on the meal, of a water-expandible bentonite clay, mixing the meal and clay with a small proportion, but not substantially less than 3 per cent, of water, subjecting the moistened mixture to a temperature above 212° F., whereby to transform the mixture into a plastic mass, subjecting said mass to a high pressure, and suddenly releasing the pressure, whereby the compressed mass is caused to expand and to become porous, the clay serving as a glutinous coating and an adhesive for the corn meal particles and as porosity-retaining means, and permitting the expanded mass to cool and to form a dry, friable, lightweight, porous solid, expanded up to about fifteen times the unexpanded volume of the corn meal.

2. The method of expanding a plant meal comprising ground seeds of plants of the class consisting of cereal grains and edible legumes, to form a dry, friable, lightweight, porous solid, wherein the plant meal is expanded up to about fifteen times its unexpanded volume, which comprises, intimately mixing with a quantity of said meal a water-expandible bentonite clay in an amount between about 0.5 per cent and about 10 per cent of the weight of said meal, incorporating water with the mixture of meal and clay in an amount between about 3 per cent and about 8 per cent of the weight of the mixture, subjecting the moistened mixture to a temperature above 212° F., whereby to transform the mixture into a plastic mass, subjecting the plastic mass to a high pressure and suddenly releasing the pressure, whereby the compressed mass is caused to expand and to become porous, the clay serving as a glutinous coating and an adhesive for the plant-meal particles and as porosity-retaining means, and permitting the expanded mass to cool and to form a dry, friable, lightweight, porous solid, wherein the plant meal is expanded up to about fifteen times its unexpanded volume.

3. An edible composition in the form of a dry, friable, lightweight, porous mass, the ingredients thereof including, in combination, a major quantity of a plant meal, comprising ground seeds of plants of the class consisting of cereal grains and edible legumes, and a water-expandible bentonite clay in an amount between 0.5 per cent and about 10 per cent of the weight of the plant meal; said clay serving as an adhesive and as porosity-retaining means in said composition, and the plant meal therein being expanded up to about fifteen times its unexpanded volume.

CHESTER W. CHAPIN.

REFERENCES CITED

The following references are of record in the file of this patent:

UNITED STATES PATENTS

| Number | Name | Date |
|---|---|---|
| 1,035,836 | Anderson | Aug. 20, 1912 |
| 1,586,159 | Mason | May 25, 1926 |
| 1,872,996 | Mason | Aug. 23, 1932 |
| 2,043,713 | Saywell | June 9, 1936 |
| 2,116,212 | Plews | May 3, 1938 |
| 2,162,376 | Collatz | June 13, 1939 |
| 2,188,180 | Felt et al. | Jan. 23, 1940 |
| 2,254,241 | Pittman | Sept. 2, 1941 |
| 2,261,456 | Warren | Nov. 4, 1941 |
| 2,282,783 | Musher | May 12, 1942 |
| 2,443,138 | Holden | June 8, 1948 |

OTHER REFERENCES

Gregory, Uses and Applications of Chemicals and Related Materials, 1939, Reinhold Pub. Corp. 330 W. 42nd St., New York, pages 85–86.